United States Patent [19]

van Dijk

[11] Patent Number: 4,934,991
[45] Date of Patent: Jun. 19, 1990

[54] TRANSMISSION CHAIN

[75] Inventor: Dominicus M. van Dijk, Waalre, Netherlands

[73] Assignee: Van Doorne's Transmissie B.V., Tilburg, Netherlands

[21] Appl. No.: 404,150

[22] Filed: Sep. 7, 1989

[30] Foreign Application Priority Data

Sep. 16, 1988 [NL] Netherlands ............... 8802293

[51] Int. Cl.$^5$ .............................................. F16G 1/22
[52] U.S. Cl. ...................................................... 474/242
[58] Field of Search ............... 474/201, 237, 240, 242, 474/244

[56] References Cited

U.S. PATENT DOCUMENTS

| | | | |
|---|---|---|---|
| 1,911,184 | 5/1933 | Flynn | 474/242 X |
| 4,473,365 | 9/1984 | Lapeyre | 474/242 X |
| 4,729,757 | 3/1988 | Cataldo | 474/242 |
| 4,798,568 | 1/1989 | McSwain | 474/242 |

Primary Examiner—Thuy M. Bui
Attorney, Agent, or Firm—Pennie & Edmonds

[57] ABSTRACT

A transmission chain to be assembled comprises alternative links 1 and links 30. In the shown embodiment the neighboring complementary links 1 and 30 kind of surround each other. Every link 1 and 30 respectively has an opening 6 and 36 respectively through which uprights 34 and 8 respectively of the links protrude. Link 1 has parts 13, 14 to be connected, which have transverse walls 2, 3 being provided with a roll-off surface having e.g. tilting lines 16–23 and link 30 has parts 42, 43 with uprights 33, 34 being provided with e.g. tilting lines 38–41. The mentioned tilting lines are internal/external surfaces to enable the chain to curve between pulleys of a continuously variable transmission.

22 Claims, 2 Drawing Sheets

TRANSMISSION CHAIN

BACKGROUND OF THE INVENTION

1. Field of the Invention

The invention relates to a transmission chain, suitable for being used between two V-shaped pulleys of a continuously variable transmission, and comprising links which are movably connected relative to one another, as well as means for the power transmission to the pulleys.

2. Description of the Related Art

Such a transmission chain is known from the German Patent Specification 1302795. Said known transmission chain consists of links which are movably connected relative to one another by means of hinge pins. The hinge pins thereby also form, with their end faces, the friction surfaces for the power transmission to the pulleys. In a further embodiment of the known transmission chain, e.g. according to the European Patent Specification 0086038, the dual function of the hinge pins has been overcome in that conical contact elements have been placed around the links, which conical contact elements provide the power transmission with their flanks. In this embodiment the hinge pins only form the hinged connections between the links.

The practical application of the known transmission chain is impeded with, or considerably restricted, by the limited life of the transmission chain and a high sound volume. The life of the chain is largely determined by the weakest part, which is generally formed by the hinge pins. It is true that overdimensioning of the weakest part results in a possibly prolonged life, but it also results in an undesired restriction in the strength-/volume-strength/weight ratio and, moreover, leads to an increased sound-volume. The sound-volume which is produced when the transmission chain is being used is especially determined by the sound which is released when the hinge pins or the contact elements collide with the pulleys. Generally a higher-frequency sound is not detected or found to be less annoying than a low-frequency sound. In order to effect a higher-frequency sound when the chain is being used, a limitation of the distance between the hinge pins or the contact elements is aimed at, which results in a larger number of collisions per time unit, with a smaller collision force, and thus in a higher-frequency sound. However, enlarging the weak chain parts in order to prolong the life, on the contrary results in a larger distance between the hinge pins or the friction surfaces, so that it is always necessary to work towards a compromise between life and sound-volume.

The object of the invention is to overcome the drawbacks described, and to provide a transmission chain with an improved life and a reduced sound-volume in comparison with the known transmission chain.

SUMMARY OF THE INVENTION

In order to accomplish that objective the transmission chain according to the invention is characterized in that adjacent links embrace one another and that the links are provided with one or more internal tilting surfaces for a hinged contact with the adjacent links.

The transmission chain according to the invention does not make use of hinge pins, whilst all the links function as equal parts, as a result of which an optimum power transmission, a large power intensity and an advantageous strength/weight ratio is obtained. All this results in a compact construction with a high strength-/volume ratio. Because of the compact construction also the sound-volume which is produced is considerably reduced.

BRIEF DESCRIPTION OF THE DRAWING

The invention will be further explained with reference to an embodiment and a drawing. In the drawing:

FIG. 1b illustrates a link of a link type B for an embodiment of the transmission chain according to the invention, which link is complementary to the link according to FIG. 1a;

DESCRIPTION OF THE PREFERRED EMBODIMENT

Figure 1B:
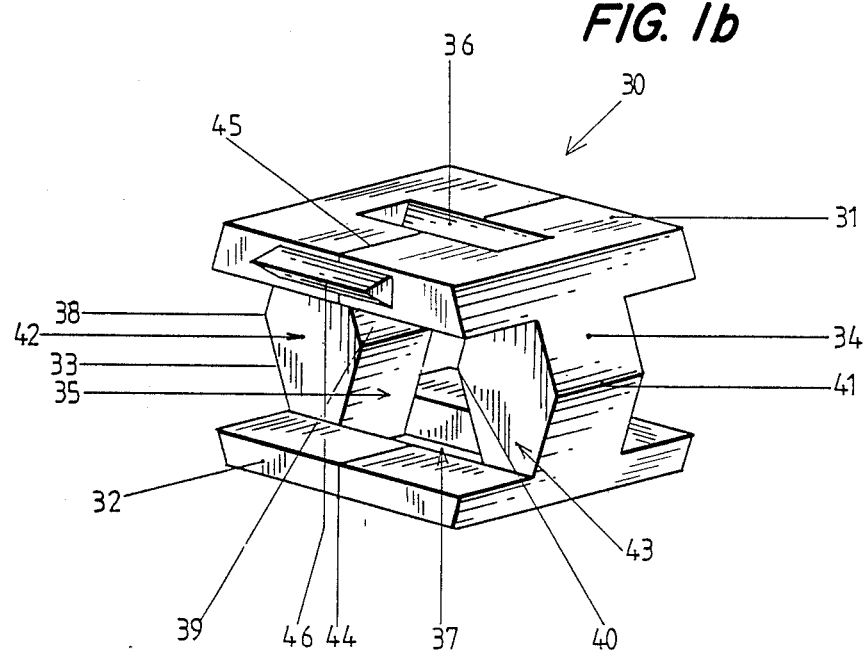

An embodiment of the transmission chain according to the invention, as shown in the drawing, comprises links of a type A as well as links of a type B, which are assembled alternately and which embrace one another thereby.

Figure 1A:
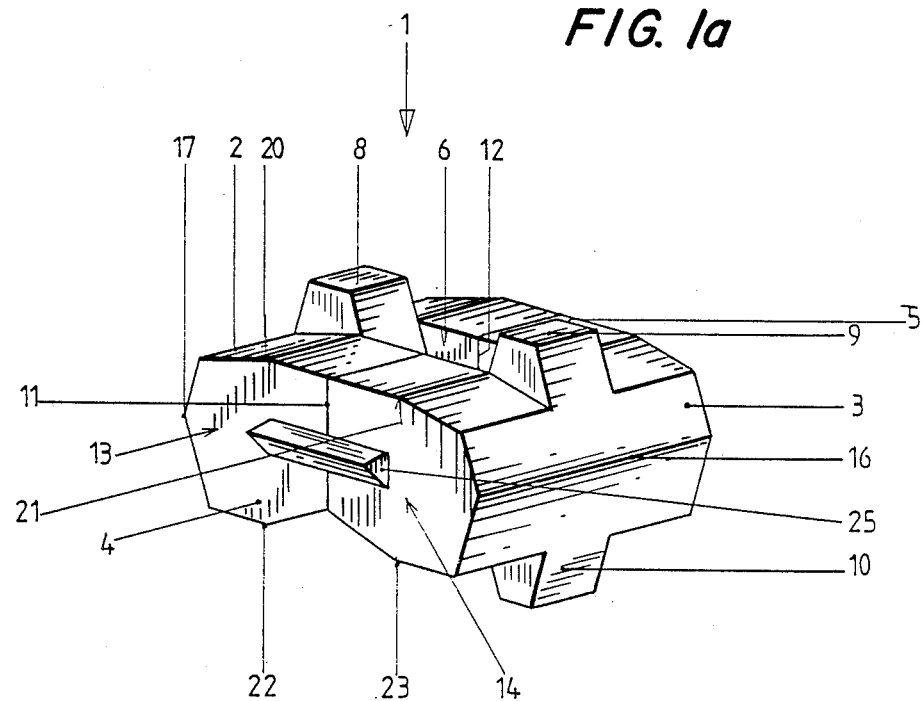
FIG. 1a illustrates a link of a link type A for an embodiment of a transmission chain according to the invention.

The link 1 of the type A (FIG. 1a) substantially consists of transverse walls 2, 3 and longitudinal walls 4, 5, which enclose an eye 6. The inner sides of the transverse walls 2, 3 are profiled, and serve as tilting surfaces for movable contact with the links 30 of the link type B. The outer sides of the transverse walls 2, 3 are likewise profiled, and serve as mutual tilting surfaces between the links of the link type A, and form a clearance angle thereby. The profiling as a tilting surface of the inner and the outer side of the transverse walls 2, 3, as well as of the lower and the upper side of the longitudinal faces, may be such that continuous e.g. convex, roll-off surfaces are formed, but in the illustrated embodiment the profiling as a tilting surface is formed from planes intersecting each other in tilting lines 16, 17, 18, 19, 20, 21, 22 and 23. The tilting lines need not define a clear-cut boundary between the intersecting planes thereby, but may also describe a tilting zone with a certain radius.

The link 1 is furthermore provided with cams 7 (not shown in FIG. 1a), 8, 9 and 10. The profilings of the transverse walls 2, 3 thereby blend with the boundary surface of the cams 7, 8, 9 and 10, both at the inner side and at the outer side.

In order to achieve a simple assembly of the transmission chain the link 1 may be composed, but not necessarily so, of several parts, e.g. two parts 13 and 14, whereby the link 1 is e.g. divided along a plane through the lines 11 and 12. After the transmission chain has been assembled the parts 13 and 14 may again be assembled into one single link 1, e.g. by welding, glueing, snap connections etc., along the lines 11 and 12.

The link 30 of the link type B is complementary to link 1. The link 30 comprises an upper plate 31 and a lower plate 32. The upper plate 31 and the lower plate 32 are mutually connected by narrow uprights 33, 34, which are spaced from each other, whereby an eye 35 is enclosed. In the upper plate 31 and the lower plate 32 there are provided openings 36, 37 between the connections with the uprights 33, 34. The inner side and the outer side of the uprights 33, 34 are profiled as a tilting surface. The profiling may be such that a continuous, e.g. convex, roll-off surface is created, in the illustrated embodiment, however, the profiling is determined by planes intersecting each other in a tilting line 38, 39, 40 and 41, said planes also blending into the edges of the lower plate 31 and the upper plate 32, and into the boundary of the openings 36 and 37, respectively. The tilting line may also define a tilting zone with a radius again, instead of the illustrated clear-cut boundary. The profiling as a tilting surface of the outer side of the uprights 33 and 34 is such that they extend downward, at least partly toward the inside, in order to form, after having been assembled in a transmission chain, a clearance angle so as to enable a movement relative to a corresponding link 30, when the transmission chain forms a curve.

In order to achieve a simple assembly of the transmission chain the link 30 may be composed, but not necessarily so, of several parts, e.g. two parts 42, 43, whereby the link 30 is divided along a plane through the lines 44, 45. After the transmission chain has been assembled the parts 42, 43 may be connected into one single link 1, e.g. by welding, glueing, snap connecting etc. An alternative division of the link 30 for an even simpler assembly, because the link 30 does not have to be divided in that case, is obtained by a division of the upper plate 31 or lower plate 32 of the upright 33, 34, whilst after assembly the upper plate or the lower plate can be connected, e.g. by welding, to the uprights 33, 34 again.

Figure 2:
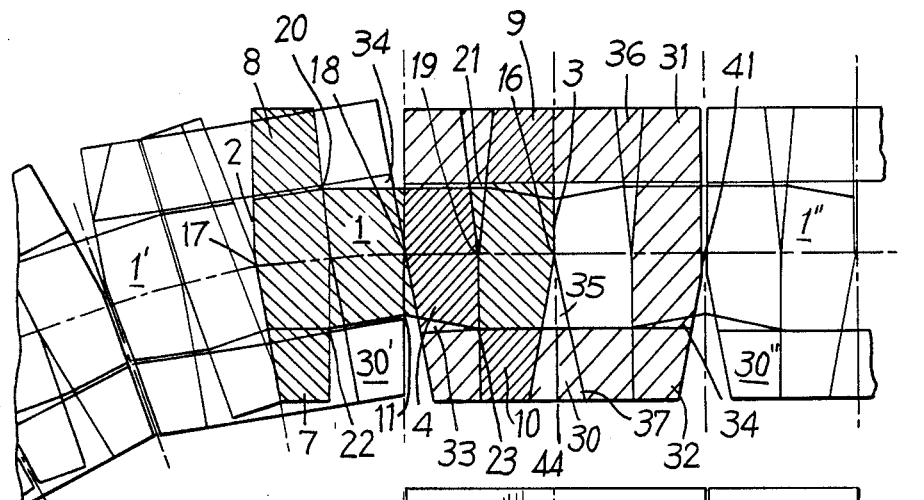
FIG. 2 illustrates, in side view and partly in section, a chain assembled from links according to FIGS. 1a and 1b.

In FIG. 2 the links 1, 1', 1" . . . are assembled, alternately with links 30, 30', 30" . . . into a transmission chain 50 (FIG. 2). The description of the transmission chain 50 hereafter will mainly be limited to the links 1, 30 and 30' and their interaction.

The link 1 embraces the uprights 33, 34 of link 30 and 30', respectively, which uprights thereby extend through the eye 6 of link 1. The cams 7, 8, 9 and 10 of link 1 extend into the respective openings 36 and 37 of the links 30 and 30'. The internal profiling as a tilting surface of the transverse walls 2, 3 with the tilting lines 17 and 16, respectively, which profiling also continues into the boundary of the cams 7-10, in combination with the internal profiling as a tilting surface of the uprights 33, 34 of the links 30 and 30', respectively, which profiling continues into the boundary of the openings 36, 37 of the links 30, 30', enables a movement between link 1 and link 30 and 30', respectively.

Since the link 1 is profiled at the upper side and the lower side of the longitudinal walls 4, 5, as a tilting surface with tilting lines 20, 21, 22, 23, a greater stability is achieved during a hinging movement between link 1 and the respective links 30, 30', since the longitudinal walls 4, 5 can thereby roll off on the lower and/or upper plate of the links 30, 30' as well.

Due to the external profiling as a tilting surface of the transverse walls 2, 3, which define a clearance angle, the links 1, 1', 1" . . . can tilt relative to one another. A corresponding tilting between the links 30, 30', 30" . . . is ensured due to the profiling as a tilting surface of the uprights 33, 34, which profiling continues into the edges of the lower plate 32.

In general the internal and external profiling as a tilting surface is such for the illustrated embodiment, except for that of the upper side and the lower side of the longitudinal walls 4, 5, that the tilting surface consists of two planes intersecting each other in a tilting line, the lower plane of which always extends downwards-inwards in order to make it possible for the transmission chain to form a curve. Instead of a profiling with a tilting line, whether or not with a certain round-off radius, also a continuous roll-off surface may be chosen.

In the present embodiment the tilting surfaces also define the limit of movement with which a maximal curvature of the transmission chain can be adjusted, e.g. the clearance angle between the adjacent links is defined with the angle of the downwardly-inwardly extending plane of the tilting surface. Assembly of the transmission chain is possible by using the links 30 and/or 1 described before, which links consist of two or more parts, which parts are only connected into one link after assembly.

Figure 3:
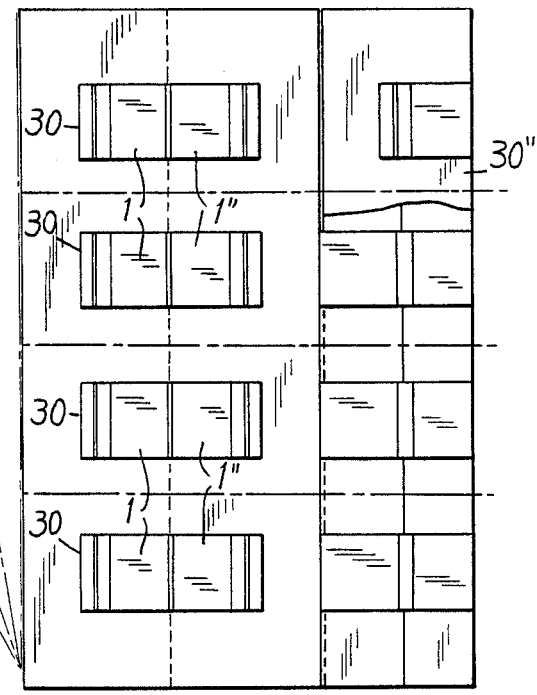
FIG. 3 is a plan view of a part of the chain according to FIG. 2.

As is illustrated in FIG. 3 a plurality of links 1 and 30, four in this case, may be advantageously placed side by side and be mutually connected, as a result of which the strength of the transmission chain increases considerably. It will be apparent that within the framework of the invention it will also be possible to produce and use wide links directly, instead of a plurality of links 1 and 30 placed side by side, said wide links corresponding, as regards function and shape, with a plurality of links placed side by side. The distance between the openings 36, 37 in the upper plate may thereby be slightly limited, as is illustrated in FIG. 3.

The means for the power transmission to the pulleys may e.g. consist of conical surfaces 25 and 46, respectively, on the longitudinal walls 4, 5 of link 1 and the longitudinal walls of the upper and/or lower plate of link 30, respectively. Alternative power transmission means are conceivable within the scope of the invention. Thus the longitudinal walls 4, 5 and the longitudinal walls of the upper plate 31 and the lower plate 32 may be completely bevelled. Also it will e.g. be possible that elongated vertical surfaces with a more or less conical external contour are provided on the links 1 and 30, respectively, whereby the elongated surfaces of the adjacent links 1 and 30 practically fit together, with a limited clearance angle in order to make it possible for the transmission chain to form a curve. It will furthermore be apparent that when a transmission chain is assembled from a plurality of links which are placed side by side, only the outermost links need to be provided with power transmission means on their outer longitudinal surface.

The invention has been described with reference to a single embodiment, but it will be apparent that within the framework of the invention several embodiments are conceivable, which are considered to fall within the scope of the invention. Thus e.g. the pitch of the chain may be varied in an advantageous manner. Also it will be possible to vary the pitch within a single chain, which is especially advantageous because of the resulting a-rhytmic sound, which is experienced to be more pleasant.

I claim:

1. Transmission chain, suitable for being used between two V-shaped pulleys of a continuously variable transmission, and comprising links which are movably connected relative to one another, as well as means for the power transmission to the pulleys, characterized in that adjacent links embrace one another and that the links are provided with one or more internal tilting surfaces for a movable contact with the adjacent links.

2. Transmission chain according to claim 1, characterized in that the links are provided with one or more eyes.

3. Transmission chain according to claim 2, characterized in that the links embrace one another in such a manner that the eyes of adjacent links alternately merge into respectively an upper and a lower longitudinal surface (link A) and into the lateral longitudinal surfaces (link B) of the chain.

4. Transmission chain according to claim 3, characterized in that link B is also provided with one or more openings in the upper and/or lower longitudinal surface.

5. Transmission chain according to claim 4, characterized in that the upper and/or lower longitudinal surface of link B is extended in the transverse direction of the chain.

6. Transmission chain according to claim 4, characterized in that at least part of the boundary of the opening in the upper and/or lower longitudinal surface of link B joins the internal tilting surfaces of link B, and functions correspondingly.

7. Transmission chain according to claims 3, 4 or 5, characterized in that link A is also provided with cams, which extend beyond the upper and/or lower longitudinal surface of link A.

8. Transmission chain according to claim 7, characterized in that at least part of the boundary of the cams of link A joins the internal tilting surfaces of link A, and functions correspondingly.

9. Transmission chain according to claim 7, characterized in that the cams of link A extend into the openings of link B.

10. Transmission chain according to claims 8 and 9, characterized in that the cams of link A and the boundary of the openings in link B form at least partial complementary tilting surfaces.

11. Transmission chain according to claims 1, 2 or 3, characterized in that the links embrace one another with some play.

12. Transmission chain according to claims 1, 2 or 3, characterized in that the links are also provided with external tilting surfaces.

13. Transmission chain according to claims 1, 2 or 3, characterized in that the tilting surfaces are described by a continuous roll-off surface.

14. Transmission chain according to claim 13, characterized in that the internal and/or external vertical tilting surfaces of adjacent links extend downwards-inwards, in order to enable the chain to make a curve.

15. Transmission chain according to claims 1, 2 or 3, characterized in that the internal and or external tilting surfaces are described by two planes intersecting each other in a tilting line.

16. Transmission chain according to claim 15, characterized in that the tilting line is formed by a tilting zone with a certain round-off radius.

17. Transmission chain according to claims 1, 2 or 3, characterized in that the tilting surfaces also serve as a boundary.

18. Transmission chain according to claims 1, 2 or 3, characterized in that the chain is assembled from links which are placed side by side in transverse direction and which are mutually connected.

19. Transmission chain according to claims 1, 2 or 3, characterized in that the side faces of the outermost links are provided with conical surfaces for the power transmission to the pulleys.

20. Link for a transmission chain according to claims 1, 2 or 3, characterized in that the link consists of two or more parts, which can be mutually connected after assembly in a transmission chain.

21. Link according to claim 20, characterized in that the link parts can be connected into a link by means of welding.

22. Continuously variable transmission provided with a transmission chain according to claims 1, 2 or 3.

* * * * *